United States Patent
Sowinski et al.

(10) Patent No.: US 8,173,215 B2
(45) Date of Patent: May 8, 2012

(54) CONTINUOUS INK JET INK COMPOSITIONS

(75) Inventors: Allan F. Sowinski, Rochester, NY (US); Wayne L. Cook, Xenia, OH (US); Joel D. Coomer, Springboro, OH (US); James D. McCann, Waynesville, OH (US); Mihaela L. Madaras, Webster, NY (US); Hwei-Ling Yau, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 414 days.

(21) Appl. No.: 12/474,730

(22) Filed: May 29, 2009

(65) Prior Publication Data

US 2010/0304028 A1 Dec. 2, 2010

(51) Int. Cl.
*B05D 1/26* (2006.01)

(52) U.S. Cl. .......................................... 427/256

(58) Field of Classification Search .................... 427/256
See application file for complete search history.

(56) References Cited

U.S. PATENT DOCUMENTS

| | | | |
|---|---|---|---|
| 3,761,953 A | 9/1973 | Helgeson et al. | |
| 4,021,252 A * | 5/1977 | Banczak et al. | 106/31.42 |
| 4,636,808 A | 1/1987 | Herron | |
| 5,370,731 A | 12/1994 | Yamashita et al. | |
| 5,526,026 A * | 6/1996 | Bowers | 347/6 |
| 5,531,818 A * | 7/1996 | Lin et al. | 106/31.28 |
| 5,801,734 A | 9/1998 | Schneider | |
| 5,830,264 A | 11/1998 | Fujioka et al. | |
| 6,588,888 B2 | 7/2003 | Jeanmaire et al. | |
| 6,682,182 B2 | 1/2004 | Jeanmaire et al. | |
| 6,863,385 B2 | 3/2005 | Jeanmarie et al. | |
| 7,370,952 B2 | 5/2008 | Inoue et al. | |
| 7,972,428 B2 * | 7/2011 | Nick et al. | 106/31.6 |
| 2005/0139122 A1 | 6/2005 | Allen et al. | |
| 2007/0052783 A1 | 3/2007 | Taguchi et al. | |

FOREIGN PATENT DOCUMENTS

| | | |
|---|---|---|
| EP | 0 569 864 A1 | 11/1993 |
| EP | 0 597 628 | 4/1996 |
| EP | 1 245 653 A2 | 10/2002 |
| WO | WO 2009/085138 A1 | 7/2009 |

* cited by examiner

*Primary Examiner* — Frederick Parker
(74) *Attorney, Agent, or Firm* — Andrew J. Anderson

(57) ABSTRACT

The invention relates to continuous ink jet printing of an aqueous pigmented ink composition recycled from a main ink supply reservoir, employing a printer with a fluid delivery system capable of measuring the ink electrical resistivity, and providing needed quantities of either vehicle replenisher fluid or fresh ink to maintain the desired recycled ink concentration. The electrical resistivity of the pigmented ink can be modified advantageously for stable ink recycling by the addition of the organic amine salt of an acid, and the pH stability of the ink can be simultaneously improved by the additional inclusion of the neutral form of the organic amine in similar molar proportions to the amine salt. The pigmented ink jet ink compositions provide for particularly stable and invariant fluid properties during periods of extended printer operation and ink recirculation.

19 Claims, No Drawings

CONTINUOUS INK JET INK COMPOSITIONS

FIELD OF THE INVENTION

The invention relates to aqueous pigmented ink compositions for continuous ink jet printing and a method for replenishing them upon loss of water through evaporation. The pigmented ink jet ink compositions provide for particularly stable and invariant fluid properties during extended printer operation.

BACKGROUND OF THE INVENTION

Continuous ink jet printing provides the fastest means of generating ink drops from the orifices of an individual printhead nozzle plate, and therefore it is valued for its ability to print at the highest feasible speeds with high image quality. The ink channel of a printhead nozzle plate supplying the orifices with ink is maintained under high fluid pressure to constantly propel an ink stream through the orifices, and a stimulation means is applied to create one or more uniform populations of drops from the ink stream that was ejected. The time lag for unpressurized refill of the ink channel of a drop-on-demand ink jet printhead is mitigated, and the drop firing frequency and printing speed can be increased. Continuous inkjet printing requires a means of intercepting constantly generated drops that are not intended to reach the printed substrate's surface, however. In prior commercial applications, electrostatic charging of ejected monomodal, uniformly sized drops was employed to enable dropwise electrostatic charge deflection by polarized electrodes, sending nonprinting drops onto a gutter surface and into a catcher return line that was under vacuum, e.g., as described in U.S. Pat. No. 4,636,808 to Herron and U.S. Pat. No. 5,801,734 to Schneider. The return line recycled the ejected but unprinted ink back to a central ink supply reservoir in a fluid management apparatus to be pumped back to the printhead under pressure for reuse. More recently, deflection strategies have emerged that use air impingement to manage the placement of bi- or multimodal drop populations, which are described, e.g., in U.S. Pat. Nos. 6,588,888 and 6,863,385 to Jeanmaire et al. Smaller nonprinting drops can be swept onto a gutter, then into an ink catcher, and finally be recycled through a return line, while the higher mass of a larger printing drop largely maintains its original trajectory. It then impacts the substrate to be printed, creating a digitally controlled impression mark.

The material compatibility properties of the electrostatic deflection process previously limited the scope of continuous ink jet ink compositions. Simple aqueous solutions of ionic dye colorants with few other functional ingredients worked the best. The prevalence of pigmented ink systems with polymer binders in consumer and office ink jet printing systems has highlighted the need for improved print permanence, durability and waterfastness in continuous ink jet applications. But the presence of ionic polymers in ink as binders or pigmented colorants with dispersants can lead to runtime problems due to material build-up from aerosol depositions, poor redissolution or redispersability of fouling ink deposits, the electrical shorting of charge leads, or even the physical instability of highly charged ink drops containing colloidal forms of material. The development of MEMS silicon-based nozzle plate devices to stimulate high frequency fluid stream break-up into bimodal drop populations, as disclosed in U.S. Pat. No. 6,682,182 to Jeanmaire et al., complements the air impingement strategies to deflect non-printing drops, and it has widened the latitude of compatible materials for aqueous continuous ink jet drop formation. Unfortunately, other continuous inkjet printer subsystems, which were optimized for inks based on simple aqueous ionic dye solutions, encounter difficulties with these more complex fluids based on pigmented colorants: in particular, the fluid delivery system.

The continuous inkjet printer fluid delivery system contains a main ink supply reservoir that feeds ink to a high pressure, low pulsation pumping system directing it to the printhead, and which receives any unprinted ink returned under vacuum from the printhead deflection, gutter and catcher systems. The jetted-and-returned ink is subject to evaporation of the carrier vehicle, and consequently the fluid delivery system contains a supply reservoir of a replenisher fluid to restore the solvent level of the ink. If the ink became too concentrated, the delicate drop control processes could be affected by viscosity changes, and printed image qualities could also change, producing visual density and hue deviations. When the ink reservoir fluid level is lowered by ink use in printing or by solvent evaporation due to extended ink recycling in a print-ready idle state, there is an opportunity to adjust the used ink concentration level by supplying the ink reservoir with either an ink vehicle replenisher fluid or with more fresh ink. In order to determine the state of concentration of the recycled ink, a variety of in-line analytical methods have been tried, but the quantification of the fluid ionic conductivity (or its reciprocal, the fluid resistivity) of the ink supply aqueous ink has proven most effective. Dye-based aqueous inks contain mobile, ionic organic colorants, and a calibrated in-line cell can measure the fluid's ability to support charge transport, which is directly proportional to the concentration of the colorant. A concentrated dye ink will show increased conductivity (and reduced resistivity), and the fluid delivery system controller can be programmed to correctly restore the ink reservoir fluid level with a solvent replenisher fluid in that circumstance, as described, e.g., in U.S. Pat. Nos. 3,761,953, 5,526,026, and EP 0 597 628. Pigmented inkjet inks typically may also contain ionic organic materials, but their physicochemical properties are profoundly different. Typically, the ionic material is derived from a base neutralized polymeric dispersant or a polymeric binder. The fluid ionic strength may be reduced, and the ionic mobility of the chemical species responsible for charge transport is much lower. The net result is that the fluid ionic conductivity is substantially reduced, and the fluid resistivity is much higher.

A second recirculation problem occurs with pigmented inks. After jetting, the deflected, guttered and caught ink is emulsified with air in the return process, and the ink can take up carbon dioxide. The carbon dioxide forms carbonic acid, which lowers the pH of the alkaline ink by protonating the available bases. In doing so, additional ionic species can be created, reducing the used ink resistivity even thought the colorant strength may not have changed. Thus the replenishment cycle may be confounded, resulting in poorer control of the recycled ink concentration. The reduced ionic conductivity of even a concentrated continuous ink jet pigment ink exacerbates the risk of adventitious disturbance of its colorant-resistivity ratio by carbonic acid or by trace amounts of ionized components in a replenisher fluid. Furthermore, the pH drop resulting from carbon dioxide uptake is a potential concern for the stability of the dispersed pigment colorant. The broad class of styrene-acrylic copolymers is very useful in inkjet inks, and the organic polymer is solubilized by the ionization of the carboxylic acid functional group of the acrylic acid moiety. Due to effects of the polymer conformation and the solvation state of the carboxylate group, its basicity may be considerably higher than simple model aliphatic carboxylate salts in water might suggest. A modest reduction in ink pH could induce colloidal instability and aggregation of the pigment particles, leading to the blocking of in-line fluid filters that protect the printhead nozzles from oversize particles that would plug them. Similar considerations apply for self-dispersed pigments that are oxidized to create solubilizing, surface-bound carboxylate salts. An organic pH buffer to stabilize drop-on-demand ink jet inks comprised of surface-treated pigment for consistent properties during storage, which is selected from the Good's buffers and employs an aminopropanediol derivative, is disclosed in U.S. Pat. No. 7,370,952 to Inoue et al; no mention of conductivity requirements for ink in continuous ink jet ink recycling is made. U.S. Pat. No. 5,830,264 to Fujioka et al. discloses an ink containing a dye colorant and a 2-amino-1,3-propanediol derivative as an organic weak base, where the pH that resulted ranged from 8 to 10; ink recycling is not disclosed, and the addition of a relatively strong protic acid to prepare the conjugate acid of the organic weak amine base is not taught.

Therefore the need exists to modify the chemical composition of pigmented continuous ink jet inks in a manner compatible with their unique material properties, in order to facilitate accurate fluid system replenishment and simultaneously protect the colloidally dispersed pigment against potentially destabilizing pH drift.

SUMMARY OF THE INVENTION

The need of more uniform fluid property control is provided by an aqueous inkjet ink composition for continuous inkjet printing comprising dispersed pigment particles; an acidic salt of an organic amine; and additional free organic amine; wherein the acidic salt of the organic amine and the additional free organic amine are present at concentrations and in relative proportion to provide a buffered pH greater than about 8 and a resistivity less than about 500 ohm-cm at 25° C., the ratio of equivalents of organic amine to equivalents of acid used to form the acidic salt of the organic amine being greater than 1.1:1.0.

Also provided is a method for replenishing ink in a continuous inkjet printer comprising:

sensing the resistivity of ink in or obtained from a main ink supply of the continuous inkjet printer; and replenishing the ink in the main ink supply of the inkjet printer with ink from a supplemental ink supply and carrier fluid from a replenishment carrier fluid supply as a function of the sensed resistivity of the ink in the main ink supply; wherein the ink in the main ink supply and the supplemental ink supply comprises an ink according to the present invention.

In addition, a method of continuous ink jet printing is provided comprising:

A) supplying a main fluid supply of a continuous inkjet printer with an aqueous fluid composition comprising
an acidic salt of an organic amine; and
additional free organic amine;
wherein the acidic salt of the organic amine and the additional free organic amine are present at concentrations and in relative proportion to provide a buffered pH greater than about 8 and a resistivity less than about 500 ohm-cm at 25° C., the ratio of equivalents of organic amine to equivalents of acid used to form the acidic salt of the organic amine being greater than 1.1:1.0;

B) ejecting a continuous stream of droplets of the fluid composition from a drop generator mechanism; and C) in response to electrical signals received from a control mechanism, selecting between printing fluid drops for marking a substrate and nonprinting fluid drops that are collected, returned to the main fluid supply, and replenished as a function of the resistivity of the fluid composition in the main fluid supply.

ADVANTAGEOUS EFFECT OF THE INVENTION

The invention provides numerous advantages. The invention provides a pigment-based ink composition, and replenishment and printing methods for maintaining excellent fluid property stability, which is essential for the control of drop formation and the rendering of uniform image optical density and hue on the printed substrate.

DETAILED DESCRIPTION OF THE INVENTION

The invention is directed at continuous ink jet printing using a conductive aqueous pigmented ink recycled from a main ink supply reservoir and using a printer with a fluid delivery system capable of measuring the ink conductivity, and providing needed quantities of replenisher fluid or fresh ink to maintain the desired recycled ink concentration. The electrical conductivity of a fluid can be measured by applying an electrical potential V across two electrodes immersed in the fluid. If interfering processes such as solution electrolysis or electrode fouling are avoided, Ohm's Law obtains:

$$V = IR$$

where I is the electrical current expressed in amperes, the proportionality constant R is the electrical resistance in the unit of ohms, and potential V is expressed in the unit of volts. The resistance of a material is directly related to its length L and inversely related to its cross-sectional area A, with a proportionality constant $\rho$, which is the material's resistivity:

$$R = \frac{\rho L}{A}$$

The resistivity expressed in ohm-m is inversely related to the conductivity $\kappa$ expressed in S.I. units of Siemens/m:

$$\kappa = \frac{1}{\rho}$$

For a fluid conductivity measurement, the ratio L/A is considered a constant value specific to an individual measurement configuration and is called the cell constant. Thus it is understood that fluid electrical conductivity and its electrical resistivity are inversely related material properties that can be interconverted readily depending on the units of their reporting. These parameters are used interchangeably hereafter.

Highly useful continuous ink jet fluid systems based on replenishment schemes that measure fluid electrical resistivity are described in U.S. Pat. No. 5,526,026, and in EP 0 597 628 B1, the disclosures of which are herein incorporated by reference in their entirety. Useful supporting concepts for continuous inkjet fluid systems that employ other means ink concentration sensing are disclosed in EP 0 571 784 B1 and EP 1 013 450 B1 and in U.S. Pat. No. 7,221,440, the disclosures of which are also incorporated by reference.

In one embodiment, basic replenishment is carried out as follows: a fluid system contains an ink resistivity measurement cell through which ink passes as it is being recirculated through the fluid handling portion of the system, including the printhead. A calculation means determines the resistance of the ink resistivity cell. A logic and control unit, responsive to the calculation means, controls the transfer of ink from a supplemental ink supply and the transfer of carrier fluid from a replenishment carrier fluid supply to the system main ink supply reservoir, to maintain the desired ink resistivity. The volume of the ink in the main ink supply is monitored by a float valve position, and when a predetermined volume has been depleted, the predetermined volume is replaced by either ink from the supplemental ink supply or replenishment carrier fluid from the replenishment carrier fluid supply.

The target resistance of the ink resistivity cell must be known in advance. The cell constant for a specific sensor can be predetermined at a given temperature using a calibrated reference fluid of known resistivity at that temperature. The temperature of the resistivity cell is desirably monitored, since the conductivity of ionic fluids shows significant temperature sensitivity. Temperature corrections of the measured fluid system sensor cell resistance are desirably carried out to improve the accuracy of the ink concentration determination. A reference setpoint value for the ink resistivity determination by the fluid system can be obtained from a pre-programmed nominal aim value for the ink. Preferably, the target ink resistivity value is updated with each new lot of fresh ink in a replaceable fluid container that is made available to the main fluid system ink supply, as is described in U.S. Pat. No. 7,192,108 issued to Lyman and incorporated herein by reference. More preferably, the fluid system is configured to measure the actual resistivity value of the fresh ink delivered from the supplemental ink supply (e.g., a replaceable fluid container) with a second calibrated resistivity sensor to provide an updated setpoint value, as described in EP 0 597 628 B1.

In a preferred embodiment of the invention, the ink jet ink composition is comprised of a pigment dispersion consisting of pigment colorant particles in association with a polymeric dispersant or a polymeric binder.

Polymeric dispersants and binders particularly useful in the present invention are copolymers prepared from at least one hydrophilic monomer that is an acrylic acid or methacrylic acid monomer, or combinations thereof, and at least one monomer comprised of a hydrophobic methacrylate or acrylate monomer containing an aliphatic chain having greater than or equal to 12 carbons, as disclosed in US Publication No. 2007/0043144, the disclosure of which is herein incorporated by reference in its entirety.

The polymeric dispersant or binder desirably comprises at least one hydrophobic monomer. The hydrophobic monomer used to prepare the polymeric dispersant or binder is comprised of a carboxylic acid ester-containing functional group. The hydrophobic monomers may be selected from any aliphatic acrylate or methacrylate monomer provided it contains an aliphatic chain comprising greater than or equal to as few as 12 carbon atoms, which may be linear or branched. Examples of useful specific hydrophobic monomers include the following: lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acryl ate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Desirably, the hydrophobic monomer having a carbon chain length of greater than or equal to 12 carbons is present in an amount of at least 10% by weight of the total copolymer, and more preferably greater than 20% by weight. The copolymer may also comprise a hydrophobic monomer comprising an aromatic group. For example, the additional aromatic group containing monomer may be benzyl acrylate or benzyl methacrylate.

The total amount of hydrophobic monomers, comprising the monomer having a chain with greater than or equal to 12 carbons and optionally, monomer containing an aromatic group, are preferably present in the polymer in an amount of 20 to 45% by weight of the total polymer. The hydrophobic aromatic-group containing monomer may be present in an amount from about 0 to 85% by weight of the total polymer, more preferably from about 0 to 60%, and most preferably from about 0 to 50%.

The monomers comprising the polymeric dispersant or binder may be totally random, or they may be arranged in blocks such as AB or ABA wherein, A is the hydrophobic monomer and B is the hydrophilic monomer. In addition, the polymer make take the form of a random terpolymer or an ABC triblock wherein, at least one of the A, B and C blocks is chosen to be the hydrophilic monomer and the remaining blocks are hydrophobic blocks dissimilar from one another. Preferably the copolymer is a random copolymer or terpolymer.

The weight average molecular weight of the copolymer dispersant or binder has an upper limit such that it is less than about 100,000 Daltons. Desirably the weight average molecular weight of the copolymer is less than about 25,000 Daltons; more preferably it is less than 15,000 and most preferably less than 10,000 Daltons. The molecular weight of the binder or dispersant has a weight average molecular weight lower limit such that it is greater than about 500 Daltons.

While a polymeric dispersant or binder is desirable, there is no requirement that the pigmented ink jet ink composition of the invention contain a polymeric material. The invention provides for pH stable pigmented inks with high conductivity to ensure reliable and accurate continuous ink jet fluid system concentration control.

The pigment particles of the pigment-based continuous ink jet ink composition of the present invention preferably have a median particle diameter of less than about 150 nm and more preferably less than 100 nm, and most preferably less than about 50 nm. As used herein, median particle diameter refers to the 50th percentile such that 50% of the volume of the particles is composed of particles having diameters smaller than the indicated diameter. Particularly desirable pigment particle sizes are those that satisfy the particle Peclet number requirements for stable continuous ink jet fluid drop formation properties, as taught in WO 2009/044096 by Clarke et al. Pigment-based ink compositions useful in the invention may be prepared by any method known in the art of ink jet printing. Useful methods commonly involve two steps: (a) a dispersing or milling step to break up the pigment aggregate into primary particles, where primary particle is defined as the smallest identifiable subdivision in a particulate system, and (b) a dilution step in which the pigment dispersion from step (a) is diluted with the remaining ink components to give a working strength ink.

The milling step (a) may be carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium, which is typically the same as, or similar to, the medium used to dilute the pigment dispersion in step (b). Inert milling media are optionally present in the milling step (a) in order to facilitate breakup of the pigments to primary particles. Inert milling media include such materials as polymeric beads, glasses, ceramics, metals and plastics as described, for example, in U.S. Pat. No. 5,891, 231. Milling media are removed from either the pigment dispersion obtained in step (a) or from the ink composition obtained in step (b). A preferred milling process is disclosed in U.S. Pat. No. 7,441,717 issued to Majka et al., and its disclosure is herein incorporated by reference.

A dispersant is preferably present in the milling step (a) in order to facilitate breakup of the pigment agglomerate into primary particles. For the pigment dispersion obtained in step (a) or the ink composition obtained in step (b), the dispersant is present in order to maintain particle stability and to prevent particle aggregation followed by settling. In addition to the polymeric dispersant, there may be, optionally, additional dispersants or polymers present for use in the invention such as those commonly used in the art of ink jet printing. For aqueous pigment-based ink compositions, useful dispersants include anionic, or nonionic surfactants such as sodium dodecylsulfate, or potassium or sodium oleylmethyltaurate as described in, for example, U.S. Pat. Nos. 5,679,138, 5,651, 813, and 5,985,017. Other polymeric dispersants useful in the practice of the invention are described in US Patent Publication No. 2006/0014855 A1 to House et al., the disclosure of which is herein incorporated by reference.

A wide variety of organic and inorganic pigments, alone or in combination with each other, may be used in the ink composition of the present invention. For example, a carbon black pigment may be combined with a colored pigment such as a cyan copper phthalocyanine or a magenta quinacridone pigment in the same ink composition. Pigments that may be used in the invention include those disclosed in, for example, U.S. Pat. Nos. 5,026,427, 5,086,698, 5,141,556, 5,160,370, and 5,169,436. The exact choice of pigments will depend upon the specific application and performance requirements such as color reproduction and image stability.

Pigments suitable for use in the invention include, but are not limited to, azo pigments, monoazo pigments, disazo pigments, azo pigment lakes, β-Naphthol pigments, Naphthol AS pigments, benzimidazol one pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Preferably the pigment is carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42. The pigmented ink jet ink composition of the invention for use in a continuous ink jet printer in a particular embodiment can be comprised of an additional water soluble dye colorant, as disclosed in EP 1 132 440 A2 to Botros et al., and EP 0 859 036 A1 to J-D. Chen.

The inks of the invention could also optionally comprise, in addition to the pigment dispersion, self-dispersing pigments that are dispersible without the use of a dispersant or surfactant may also be useful in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups. Examples of self-dispersing type pigments include, but are not limited to, Cab-O-Jet® 200 and Cab-O-Jet® 300 (Cabot Corp.) and Bonjet® Black CW-1, CW-2, and CW-3 (Orient Chemical Industries, Ltd.).

The pigments used in the ink composition of the invention may be present in any effective amount, generally from 0.1 to 10% by weight, and preferably from 0.5 to 6% by weight. In one embodiment the weight ratio of the copolymer to the pigment is 0.15 to 0.8.

The inks of the invention could also optionally comprise, in addition to the pigment dispersion, dyes known in the art of ink jet printing. For aqueous-based ink compositions dyes suitable for use in the invention include, but are not limited to, water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention are as follows: yellow dyes including: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6,7, 11, 12, 13, 14, 15, 16, 17, 18,22, 23,24, 25,26, 27, 37, and 42; and C.I. Food Yellow 3 and 4; magenta dyes including: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; and C.I. Food Red 7, 9, and 14; cyan dyes including: C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43,44, and 46; and C. I. Food Blue 1 and 2; black dyes including: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I. Direct Black 17, 19, 22, 32, 39, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, 31, and 18; and C.I. Food Black 2, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; the metal azo dyes disclosed in U.S. Pat. Nos. 5,997,622 and 6,001,161.

It is also contemplated that the ink compositions of the present invention may also contain non-colored particles such as inorganic particles or polymeric particles. The use of such particulate addenda has increased over the past several years, especially in ink jet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 describes the use of a water-dispersible polymeric latex in dye-based inks in order to improve light and ozone resistance of the printed images. The ink composition may contain non-colored particles such as inorganic or polymeric particles in order to improve gloss differential, light and/or ozone resistance, waterfastness, rub resistance and various other properties of a printed image; see for example, U.S. Pat. Nos. 6,598,967 or 6,508,548.

Examples of inorganic particles useful in the invention include, but are not limited to, alumina, boehmite, clay, calcium carbonate, titanium dioxide, calcined clay, aluminosilicates, silica, or barium sulfate. Examples of polymeric particles useful in the invention include; water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

Examples of useful polymeric particles are styrene-acrylic copolymers sold under the trade names Joncryl® (S.C. Johnson Co.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco Corp.).

These polymeric particles are preferred because they are compatible in typical aqueous-based ink compositions, and because they render printed images that are highly durable towards physical abrasion, light and ozone.

The non-colored particles used in the ink composition of the invention may be present in any effective amount, generally from 0.01 to 20% by weight, and preferably from 0.01 to 6% by weight. The exact choice of non-colored particles will depend upon the specific application and performance requirements of the printed image.

Ink compositions may also contain water-soluble polymers often referred to as resins or binders in the art of inkjet ink compositions. The water-soluble polymers useful in the ink composition are differentiated from polymer particles in that they are soluble in the water phase or combined water/water-soluble solvent phase of the ink. Included in this class of polymers are nonionic, anionic, amphoteric and cationic polymers. Representative examples of water soluble polymers include, polyvinyl alcohols, polyvinyl acetates, polyethylene glycols, polypropylene glycols, polyvinyl pyrrolidones, carboxymethyl cellulose, polyethyloxazolines, polyethyleneimines, polyamides and alkali soluble resins, polyurethanes (such as those found in U.S. Pat. No. 6,268,101), polyacrylic acids, styrene-acrylic methacrylic acid copolymers (such as Joncryl® 70 from S.C. Johnson Co., TruDot® IJ-4655 from MeadWestvaco Corp., and Vancryl® 68S from Air Products and Chemicals, Inc.

Ink compositions useful in the invention may include humectants and/or co-solvents in order to prevent the ink composition from drying out or crusting in the nozzles of the printhead, to aid solubility of the components in the ink composition, or to facilitate penetration of the ink composition into the image-recording element after printing. Representative examples of humectants and co-solvents used in aqueous-based ink compositions include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, di(ethylene glycol), tri(ethylene glycol), tetra(ethylene glycol), propylene glycol, poly(ethylene glycol), poly(propylene glycol), 1,2-propanediol, 1,3-propanediol, 1,2-butanediol, 1,3-butanediol, 1,4-butanediol, 1,2-pentanediol, 1,5-pentanediol, 1,2-hexanediol, 1,6-hexanediol, 2-methyl-2,4-pentanediol, 1,2-heptanediol, 1,7-hexanediol, 2-ethyl-1,3-hexanediol, 1,2-octanediol, 2,2,4-trimethyl-1,3-pentanediol, 1,8-octanediol, glycerol, 1,2,6-hexanetriol, 2-ethyl-2-hydroxymethyl-propanediol, saccharides and sugar alcohols and thioglycol; (3) lower mono- and di-alkyl ethers derived from the polyhydric alcohols; such as, ethylene glycol monomethyl ether, ethylene glycol monobutyl ether, ethylene glycol monoethyl ether acetate, di(ethylene glycol) monomethyl ether, and di(ethylene glycol) monobutyl ether acetate (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide, and tetramethylene sulfone.

Surfactants may be added to the ink composition to adjust the surface tension of the ink to an appropriate level provided that they do not compromise the colloidal stability of the pigment particles. The surfactants may be anionic, cationic, amphoteric or nonionic and used at levels of about 0.01 to 5% of the ink composition. Examples of suitable nonionic surfactants include, linear or secondary alcohol ethoxylates (such as the Tergitol® 15-S and Tergitol® TMN series available from Union Carbide Corp. and the Brij® series from Uniquema®, Imperial Chemical Industries PLC), ethoxylated alkyl phenols (such as the Triton® series from Union Carbide Corp.), fluoro surfactants (such as the Zonyls® from DuPont; and the Fluorads® from 3M Co.), fatty acid ethoxylates, fatty amide ethoxylates, ethoxylated and propoxylated block copolymers (such as the Pluronic® and Tetronic® series from BASF, ethoxylated and propoxylated polysiloxane based surfactants (such as the Silwet® series from GE Silicones, General Electric Co.), and acetylenic polyethylene oxide surfactants (such as the Surfynols® from Air Products and Chemicals, Inc.).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphate esters of alkyl and aryl alcohols, including the Strodex® series from Dexter Chemical LLC.), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples are of the above surfactants are described in *McCutcheon's Emnulsifiers and Detergents North American Edition International Edition 1996 Annuals*, Vol. 1, McCutcheon Division of Manufacturing Confectionar Co., Glen Rock, N.J. (1996).

A biocide may be added to an ink jet ink composition to suppress the growth of microorganisms such as bacteria, molds, fungi, etc. in aqueous inks. Useful preservatives are exemplified by alkylisothiazolones, chloroalkylisothiazolones, and benzisothiazolones. Preferred commercial products for use in an ink composition include Proxel® GXL (Arch Chemicals, Inc.) and Kordek® MLX (Rohm and Haas Co.) at a final concentration of 0.0001-0.5 wt. %.

Additional additives which may optionally be present in an ink jet ink composition include thickeners, conductivity enhancing agents, anti-kogation agents, drying agents, waterfastness agents, dye solubilizers, chelating agents, binders, light stabilizers, viscosifiers or thickeners, buffering agents, anti-mold agents, anti-cockle agents, anti-curl agents, stabilizers, antifoamants and defoamers. An aqueous ink jet ink composition for use in a continuous ink jet printer desirably contains water as the principal vehicle or carrier medium, colorant, humectant, biocide, and surfactant; it can desirably further contain one or more types of other components, including and not limited to a film-forming binder or mordant, a secondary colorant, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal agent, a jetting aid, a filament length modifier, a trace of multivalent cationic flocculating salt, a solution conductivity control agent, or a compound for suppressing electrostatic deflection charge shorts when ink dries on the charge ribbon electrodes. Compounds useful for increasing pigment ink dried film resistivity for suppressing charge lead shorts are described in U.S. Pat. No. 5,676,744 to Thakkar et al. Inorganic and organic ink additives useful for controlled flocculation of pigmented ink jet compositions are described in US 2004/0266908.

The total humectant level of the ink jet ink composition for continuous ink jet printing is desirably from 0 to about 10% by weight. The total humectant level of the ink is the sum of the individual sources of humectant ingredients, which may include humectant added directly during ink formulation, and for example humectant associated with a commercial biocide preparation as a supplemental ingredient, or with a commercial pigment dispersion preparation that may be present to prevent so-called "paint-flakes" of dried pigment cake forming around a bottle cap, as described in US Publication No. 2005/0075415 to Harz et al. More desirably, the total humectant level is from about 1% to about 7%, in order to facilitate drying of the ink jet printing recording material in a high speed printer while simultaneously encouraging higher equilibrium moisture content in dried ink film on hardware for redispersion and clean-up by ink, or by start-up and shut-down fluids, or by a printhead storage fluid. As used herein in reference to ink jet ink compositions for use in a continuous ink jet printer, desirable humectants may be comprised of an alcohol, such as 2-propanol or 1-pentanol; a polyol, such as glycerol or ethylene glycol; a glycol ether, such as di(ethylene glycol), tri(ethylene glycol), poly(ethylene glycol)-400 (average $M_n$ ca. 400, herein referred to as PEG-400 for convenience), or poly(propylene glycol)-425 (average Mn ca. 425); an aromatic glycol ether such as propylene glycol phenyl ether (e.g., Dowanol® PPh glycol ether) or an aliphatic glycol ether such as diethylene glycol mono-n-butyl ether or poly (ethylene glycol) methyl ether (average M, ca. 550); a lactain, such as 2-pyrrolidinone, N-methyl-2-pyrrolidinone, or polyvinylpyrrolidone; an alternative polar solvent such as dimethyl sulfoxide, N,N-dimethylformamide, acetainide, N-methylacetamide, N,N-diethylacetamide or morpholine; a polyvalent aliphatic organic alcohol such as 1,5-pentanediol, 1,2-hexanediol, 1,6-hexanediol, or 2-ethyl-2-hydroxymethyl-1,3-propanediol, or a saccharide such as sorbitol or fructose; or an urea. It is recognized that the effectiveness of the humectant in accomplishing water retention and wetting will depend on its chemical structure. When the humectant chemical structure produces lower water retention, higher levels of the humectant can be used without adversely affecting the drying rate of the printed ink.

The pH of the ink jet ink composition directed at CIJ is desirably adjusted from about 8 to about 12; more desirably, the pH is about 8 to 10. When the ink composition is used in hardware with nickel or nickel-plated apparatus components, an anticorrosion inhibitor such as the sodium salt of 4-or 5-methyl-1-H-benzotriazole is desirably added and the pH adjusted to be from about 10 to about 11. When the ink composition is used with printheads with components fabricated from silicon that are in contact with the fluid, the ink composition pH is desirably adjusted to be from about 8 to about 10.0; more desirably, the pH ranges from about 8.0 to about 9.5, and most preferably about 8.5 to about 9.0. In order to minimize the risk of excessively protonating carboxylate anions associated with polymeric dispersant that might render the ink composition more susceptible to pigment flocculation, pH levels lower than about 7 are desirably avoided. With hardware components fabricated from silicon in contact with the ink composition, pH levels higher than about 10 can induce significant rates of etch and corrosion that may impair the operation of the device over time.

In the preparation of a solution of polymeric dispersant or binder, the copolymer formed following completed reaction of the monomers (following treatment with a polymerization initiator) is reacted with a base to deprotonate acidic functional groups on the hydrophilic polymer segments, such as carboxylic acid groups, in order to solubilize the polymer for pigment milling. Desirably the copolymer is reacted with an organic base to deprotonate acidic functional groups. Inorganic bases such as potassium hydroxide can be used; however, amine base neutralization of the polymeric dispersants or binder, from about 50 to 100% of the sites capable of being titrated, is also specifically contemplated. Wet rub durability of the printed ink image can be improved by amine neutralization. Defoaming agents comprised of phosphate esters, polysiloxanes, or acetylenic diols are optionally used with the ink compositions directed at CIJ to minimize foam formation caused the fluid agitation associated with drop catching and ink recirculation.

The invention provides for an aqueous continuous ink jet ink composition with an acidic salt of an organic amine; and additional free organic amine, wherein the organic amine salt and organic amine are present at concentrations and in relative proportion to provide a buffered pH greater than about 8 and a resistivity less than about 500 ohm-cm. To ensure additional free organic amine is present, the ratio of equivalents of organic amine to equivalents of acid used to form the acidic salt of the organic amine is greater than 1.1:1.0. The transport of electrically charged ions in the liquid ink is responsible for producing its electrical conductivity and for reducing the ink resistivity from the level found in ultrapure water, which is about 25 megaohm-cm at 18° C. The conductive properties of an ionic species i are described by its electric mobility $u_i$ as follows:

$$u_i = \frac{|z_i|e}{6\pi\eta R_i}$$

where the mobility of ion i is related to the product of the absolute magnitude of its charge $z_i$ and the elementary electric charge e in coulombs, divided by the Stokes drag factor, which is the product of $6\pi$, the fluid viscosity $\eta$, and the solvated radius $R_i$ of the ion i. The solution conductivity $\kappa$ is the resulting charge transport capability of the fluid derived from the summation of the individual mobilities of the plurality of ions it contains:

$$\kappa = F\sum_i |z_i| u_i C_i$$

where F is the Faraday constant and $C_i$ is the concentration of particular ion i. While fundamental principles of electrochemistry indicate broadly that the addition of ionic compounds to the ink will lower its resistivity at a given temperature, the complexity of the chemical composition of a working continuous ink jet ink drives the fluid away from idealized chemical states (e.g., a unadulterated aqueous solvent, activity coefficients of unity, a single phase of matter (i.e., no colloidal dispersions of solids) and negligible interaction of ionic species at infinite dilution), and these simple mathematical descriptions cannot be quantitatively relied upon. Thus even if the ink constituent electric mobilities were all known, they could not simply be summed as above to accurately predict the ink's solution conductivity. Furthermore, the concern of ink pH drift due the environmental effects of ink recycling in air is not addressed by the electrochemical concepts.

The term pH denotes the negative value of the base 10 logarithm of the hydrogen ion concentration. Hydrogen ion can form in aqueous solutions 20 from the dissociation of water into a proton and a hydroxide anion, or by the dissociation of an acid into the hydrogen ion and its conjugate base as below:

$$HA = H^+ + A^-$$

The acid dissociation constant $K_a$ for the reversible reaction is defined as follows:

$$K_a = \frac{[H^+][A^-]}{[HA]}$$

It is similarly useful to consider the negative value of the base 10 logarithm of the acid dissociation constant and define that value as the $pK_a$. Under ideal conditions in which the equation above is observed to hold true, and when the concentration of the acid and its conjugate base are equal, the solution pH will reflect the $pK_a$ of the acid. The pH of pure water is 7.0, and alkaline solutions obtain above that point, while acidic solutions obtain below that point. In order to satisfy the needs of stable continuous ink jet ink recirculation and drop formation, it is desired to maintain the ink under alkaline conditions. To minimize the change in ink pH in response to the addition of an acidic or a basic material, it is necessary to establish pH stabilization, sometimes referred to as buffer action. The buffer action or strength is increased for a given aqueous composition under conditions where the ratio of the concentration of added acid to that of added conjugate base of the acid is close to one, and when the sum of the concentrations of the added acid and base are much larger than the sum of the concentrations of the hydrogen ion and hydroxide anion. The inventors have surprisingly found that the conductivity of the continuous inkjet ink composition can be increased suitably for stable recycling by the addition of the organic amine salt of an acid, and that the pH stability of the ink can be simultaneously improved by the inclusion of the neutral form of the organic amine in similar molar proportions to amine salt.

The amine of the invention is selected based in part on its aqueous solution $pK_a$ near ambient temperatures (e.g., 20-30° C.), which is desirably similar to the final ink pH as noted. The continuous ink jet pigmented ink of the invention is at pH of at least about 8.0, to ensure the colloidal stability of a typical polymer-stabilized pigment dispersion. More desirably, the ink pH is at least about 8.5 to improve the dried ink redispersability characteristics. The invention is highly suitable for use with silicon-based MEMS devices that serve as printhead drop forming nozzle plates. Silicon and silicon dioxide layers comprising silicon devices are vulnerable in aqueous solutions to degradation by dissolution, especially at elevated temperatures; pH levels higher than about 10 can induce significant rates of etch and corrosion that may impair the operation of the device over time even at room temperature. The ink pH does not exceed about 10.0, and more desirably is less than about 9.3. The preferred pH ranges of the invention direct the selection of organic amines to less basic examples of the class, many of which have $pK_a$ values that are higher than 10.0. A useful compilation of organic amines that describes their basicity and that provides many example amine $pK_a$ values is reported by J. W. Smith in Chapter 4, "Basicity and Complex Formation", of *The Chemistry of the Amino Group*, Patai, S., Ed., John Wiley and Sons: New York, 1968; pp 161-204. It is understood that the reported ideal aqueous solution $pK_a$ value is merely a guide, since the inkjet ink will contain organic solvents, micellar solution aggregates and colloidally dispersed solid phases that modify the solvation properties of the solvent and affect the functional acidity of the acid derived from the amine base. Further, the molar level of free base in relation to its conjugate acid will also affect the ink pH. Therefore it can fall within the scope of the invention to utilize organic amines with reported $pK_a$ values above and below the desired ink pH range.

Organic amines are amines comprised of at least one organic substituent, and as employed in the invention the substituent is desirably an aliphatic group. In order to reduce the possibility of a chemical reaction of the amine with other ink ingredients, secondary amines are more preferred than primary amines. Most preferred are tertiary amines, where the neutral amine base has three organic substitutents. The amine aliphatic group in turn may be substituted with any suitable functional groups that are compatible with the application of the ink jet ink. Specific examples include benzylamine, 2-phenylethylamine, N-methylbenzylamine, N,N-dimethylbenzylamine, N-propylbenzylamine, N-t-butyl-N-ethylaniline, cyclopentylamine, cyclohexylamine, N-,N-dimethylcyclohexylamine, trimethylamine, tri-n- butylamine, N,N-dimethyl-n-propylamine, N,N-dimethyl-i-butylamine, tetramethyldipropylenetriamine, pentamethyldipropylenetriamine, pentamethylenediethylenetriamine, 2,2,2-trifluoroethylamine, and 3,3,3-trifluoro-n-propylamine. Other examples include morpholine, N-methylmorpholine, N-ethylmorpholine, and dimethylpiperazine. More preferred are aliphatic amines substituted with hydroxyl groups, such as monoethanolamine, diethanolamine, 3-amino-1-propanol, N-methylethanolamine, N-benzyl-N-methylethanolamine, triethanolamine, 2-(2-aminoethoxy)ethanol, N,N-dimethyl-2-(2-aminoethoxy)ethanol, N-methyldiethanolamine, and N,N-dimethylethanolamine. Examples of aminopropanediol derivatives include 1-methylamino-2,3-propanediol, 1-amino-2,3-propanediol, 1-amino-2-ethyl-2,3-propanediol, 2-amino-2-methyl-1,3-propanediol, 2-amino-2-ethyl-1,3-propanediol, and 2-amino-2,3-propanediol.

A protic acid is used to generate a salt from the organic amine. Typical inorganic acids include boric, hydrochloric, nitric, phosphoric and sulfuric acids. Typical organic acids include methanesulfonic, acetic, proprionic, oxalic and lactic acids. Preferred are short chain aliphatic carboxylic acids, such as acetic acid and lactic acid. The pH of the final aqueous ink compositions of the invention may also be adjusted by the addition of organic or inorganic acids or bases. The acid desirably has a $pK_a$ of less than about 6.5, and preferably that is at least 2 units lower than that of the conjugate acid formed from the organic amine base, in order to ensure adequate reaction. The salt may be formed in situ during the mixing of the ink, or it may be prepared in advance as a dilute solution or even isolated as pure substance. Ideally the ink is comprised of the organic amine base and its conjugate acid in about equal molar proportions, and therefore the ratio of equivalents of amine base to equivalents of inorganic or organic acid used to form the conjugate acid of the amine base is preferably at least 1.3:1.0; more preferably it is about 1.5:1.0; most preferably it is about 2.0:1.0; and preferably it is less than about 3.0:1.0, and more preferably less than about 2.5:1.0. The ink may be comprised of at least about 0.03 mole per kg of monobasic organic amine to provide the desired buffered pH, or an equivalent-adjusted amount of multibasic organic amine reflecting the number of the participating basic amine groups. Desirably, the ink is comprised of at least about 0.06 mole per kg of monobasic organic amine to provide the desired pH with adequate buffer strength. The ink desirably has at least about 0.05 milliequivalents of strong acid titratable base, the majority of which is derived from the buffering organic amine. More than one organic amine can be used to achieve the desired ink buffered pH, and participating organic amines may be introduced into the ink composition through the addition of a neutralized polymer during the preparation of the pigment dispersion, or through the addition of a neutralized polymeric binder, as well as directly added or formed in situ during ink mixing. The resultant ink resistivity is less than about 500 ohm-cm, and more preferably it is less than about 300 ohm-cm. It is desirable that the ink resistivity not reach too low a value, since it is appreciated that high ionic strength of the pigmented ink jet ink composition potentially will affect the colloidal stability of the dispersed particles, causing them to aggregate and the ink to fail. US Publication No. 2005/0090599 describes the coagulation of aqueous dispersed pigmented ink particles by salt solutions at a concentration of 0.2 moles per liter. The ink resistivity is therefore desirably greater than about 50 ohm-cm, and more preferably it is greater than about 100 ohm-cm, and most preferably between about 200 and 300 ohm-cm.

The replenisher fluid may be comprised exclusively of water, and preferably the water is completely deionized in order to avoid the accumulation of conductive inorganic salts in the replenished ink. Desirably, the aqueous replenisher fluid contains a biocide to suppress the adventitious growth of microscopic organisms. Preferred commercial products for use in a replenisher composition include Proxel® GXL (Arch Chemicals, Inc.) and Kordek® MLX (Rohm and Haas Co.) at a final concentration of 0.0001-0.5 wt. %. The resistivity of the replenisher fluid desirably exceeds 5,000 ohm-cm, and more desirably exceeds about 200,000 ohm-cm.

In one embodiment of the invention, the ink jet ink composition for use in a continuous ink jet printer is printed by a method employing a plurality of drop volumes formed from a continuous fluid stream, and non-printing drops of a different volume than printing drops are diverted by a drop deflection means into a gutter for recirculation, as disclosed in U.S. Pat. No. 6,588,888 to Jeanmaire et al., U.S. Pat. No. 6,554,410 to Jeanmaire et al., U.S. Pat. No. 6,682,182 to Jeanmaire et al., US Publication No. 2003/0202054 to Jeanmaire et al., U.S. Pat. No. 6,793,328 to Jeanmaire, U.S. Pat. No. 6,866,370 to Jeanmaire, U.S. Pat. No. 6,575,566 to Jeanmaire et al., and U.S. Pat. No. 6,517,197 to Hawkins et al., the disclosures of which are herein incorporated in their entirety by reference. In another preferred embodiment, the ink jet ink composition is printed using an apparatus capable of controlling the direction of the formed printing and non-printing drops by asymmetric application of heat to the fluid stream that initializes drop break-up and also serves to steer the resultant drop, as disclosed in U.S. Pat. No. 6,079,821 to Chwalek et al, and in U.S. Pat. No. 6,505,921 to Chwalek et al., the disclosures of which are herein incorporated in their entirety by reference. Useful ink agitation, heated ink supply and printhead and fluid filtration means for CIJ pigmented ink jet ink compositions are described in U.S. Pat. No. 6,817,705 to Crockett et al. Additional printer replenishing system approaches for maintaining ink quality and countering the effects of volatile ink component evaporation are described in U.S. Pat. No. 5,473,350 to Mader et al.

Continuous ink jet printing has needs for improved ink compositions and printing methods to satisfy market demands for high printed optical density, color fidelity, image stability, print durability to fade and abrasion, and waterfastness. High-speed continuous ink jet printing is used in commercial market applications and generally involves printing variable information for transactional documents such as invoices and credit card billing statements, and also scratch-off lottery tickets. Variable-data imprinting sub-systems, sometimes referred to as print stations, consist of a sub-systems that include a printhead, control electronics, an ink reservoir, an ink pump and an ink delivery system, and they can be added to an existing high-speed press system for black text printing in labeling or mailing applications. Commonly used dye-based inks can provide adequate optical density on the normal mix of paper substrates, such as plain bond papers, surface-treated papers, or coated and calendared business gloss papers or heavy-stock covers. Dye-based inks, however, suffer poor waterfastness on all substrates, and low durability on glossy papers against wet rub abrasion that can render text and universal packaging code information illegible. Self-dispersed carbon black pigment-based ink compositions lacking a film-forming polymer binder offer high optical density on untreated bond papers that approach electrophotographic-printing quality, with visual density values of about 1.4. The colorant, however, is readily redispersed by wet rub abrasion, resulting in undesirably low durability and smear. Polymer-dispersed carbon black pigment ink compositions of the art offer excellent waterfastness, wet rub durability, and dry rub abrasion on all substrates, but optical density suffers on plain papers, where the colorant apparently wicks along the cellulose fibers into the interior of the paper, leading to grayish appearing printed text. Durable carbon black pigmented ink jet compositions adaptable to continuous ink jet ink formulation and printing are described US Publication No. 2007/0043146, the disclosure of which is incorporated herein by reference. A continuous ink jet printing ink composition comprised of carbon black pigment and an associated water soluble polymer resin is described in EP 0 853 106 to Thakkar et al., in U.S. Pat. No. 6,203,605 to Thakkar et al., and in U.S. Pat. No. 5,512,089 to Thakkar.

The durability, gloss, and other properties of a printed ink jet image can be improved by the application of a (preferably colorless) polymeric overcoat ink composition, as disclosed, e.g., in U.S. Pat. No. 7,219,989 B2 to Uerz et al., the disclosure of which is incorporated herein by reference in its entirety. In order to achieve the high printer speeds and throughput associated with continuous ink jet web printing, an overcoat composition can be applied using a continuous ink jet printer printhead following in line one monochrome continuous inkjet printer linehead of drop-forming nozzles, providing for a monochrome imprinter system or a monochrome printing press with improved printed image properties. Alternatively, an overcoat composition can be applied using a continuous ink jet printer printhead in line with multiple continuous inkjet printer lineheads of drop-forming nozzles, providing a multicolor ink jet imprinter system or a multicolor printing press, desirably a full color press, with improved printed image properties. The drop size, addressability, and printed resolution of the overcoat composition are not required to be the same as the printed ink jet inks, and differing continuous inkjet printhead technologies could be used, as long as the firing speed and paper transport speed requirements were met. Since the polymeric overcoat composition would be subjected to the same fluid recycling and replenishment operations as the pigmented ink compositions of the invention, in a further embodiment of the invention the same benefits of improved fluid pH stability and replenishment accuracy can be provided by including in the polymeric overcoat composition, an acidic organic amine salt and an organic amine that are present at concentrations and in relative proportion to provide a buffered pH greater than about 8 and a resistivity less than about 500 ohm-cm substantially as described above for pigmented ink compositions.

EXAMPLES

Preparation of Continuous Ink Jet Ink Samples

The suffix (c) designates control or comparative ink jet ink compositions, while the suffix (e) indicates example ink jet ink compositions. The abbreviation "Wt %" indicates the ingredient weight percent. Carbon black pigment dispersion content is based on the weight percent of carbon black.
Polymeric Dispersant Preparation
Polymeric Dispersant P-1

In a 1-liter, three-necked round-bottom flask equipped with a reflux condenser were mixed under nitrogen atmosphere 37.0 g of benzyl methacrylate, 30.0 g of stearyl methacrylate, and 33.0 g of methacrylic acid, 1.5 g of 1-dodecanethiol, 400 mL of methyl ethyl ketone, and 1.2 g of AIBN. The solution was stirred and purged with nitrogen for 20 minutes and heated to 70° C. in a constant temperature bath. After 24 hours, the resulting solution was cooled. The resulting polymer solution was mixed with water and dimethylaminoethanol to achieve 100% acid neutralization. Thereafter the whole mixture was distilled at 50° C. under reduced pressure to remove the organic solvent. The final polymer solution had a concentration of ca. 20 wt % in water and its pH was ca. 7. The weight average molecular weight was about 10,800 Daltons.
Polymeric Dispersant P-2

A 5-liter, three-necked round bottom flask equipped with a mechanical stirrer, a reflux condenser, and a gas inlet was charged with 225 g of 1-methoxy-2-propanol and was sparged with nitrogen. Akzo-Nobel Chemicals, Inc., initiator Perkadox AMBN-GR (1.9 g) was added with stirring. A reactant reservoir was charged with 225 g of 1-methoxy-2-propanol, 23.4 g of 1-dodecanethiol, 203.5 g of benzyl methacrylate, 165.0 g of stearyl methacrylate, and 181.5 g of methacrylic acid, and the solution was degassed by nitrogen sparging. AMBN-GR (7.7 g) was added and mixed in. The reactor temperature was raised to 77° C. and the reactants were pumped from the reservoir at a about 2.3 mL/min over a 360-min period. The reaction mixture was stirred for at least 12 h at about 77° C. The polymer was neutralized to completion with dimethylaminoethanol and stirred for 45 min. The reaction mixture was diluted with 2,580 g of water and filtered through a Pall Corp. Ultipleat polypropylene cartridge filter. The final polymer solution had a concentration of ca. 20 wt. % solids and its pH was 8.6. The average the weight average molecular weight was 9,070 Daltons.
Pigment Dispersion Preparation
Pigment Dispersion K-1

To a 2.5-gallon, 9-inch diameter and 12-inch deep, double-walled stainless steel mixing vessel containing four baffles is added water (1,273 g) and a solution of Polymeric Dispersant P-1 (727 g of a 20.6 wt % solution). A nominal 4-inch, ring-style disperser impeller (Hockmeyer Equipment Corp. D-Blade) driven by a Charles Ross & Son Co. Model HSM-100LH-2 High Shear Mixer is centered 2 inches above the bottom of the mixing vessel, and stirring is initiated. Degussa GmbH. NIPex® 180 IQ carbon black pigment (500 g) is slowly integrated into the fluid. Milling media comprising beads of polystyrene resin (copolymer of styrene and divinylbenzene/ethylvinylbenzene mixture) with an average particle diameter of 50 micrometers (3,000 g) is added slowly while increasing impeller speed. The mixture is milled with an impeller blade tip speed of ca. 19 m/sec for about 20 h at an internal temperature of 25-35° C. Samples are periodically removed, diluted and filtered for particle size determination by a Microtrac, Inc., Nanotrac® 150 dynamic light scattering analyzer. When milling is complete, the dispersion/media milling mixture is further diluted with a solution of water (2,475 g) and Rohm and Haas Co. Kordek™ MLX preservative (25 g) to a final pigment concentration of about 10% and theoretical dispersion batch size of 5000 g. The impeller is removed from the dispersion/media milling mixture, and a vacuum separator filter probe is immersed. The filter probe consists of 0.25-inch ID Tygon® plastic tubing connected to a sealed 2-inch length of 1.25-inch OD tubular, 38-micrometer screen (Johnson Screens, Inc.). A peristaltic pump is used to separate the dispersion from the milling media and it is subsequently filtered through a 0.3-micrometer removal efficiency Pall Corp. Profile II® depth filter. Roughly 4 kg of dispersion is recovered, approximately 80% yield. The volume-weighted $50^{th}$ percentile particle size distribution diameter is about 62 nm, and the $95^{th}$ percentile particle size distribution diameter is about 110 nm.

Pigment Dispersion K-2

Using a procedure analogous to Pigment Dispersion K-1, NIPex 180 IQ carbon black pigment (500 g) is dispersed in a solution of water (1,000 g) and a solution of Polymeric Dispersant P-2 (1,000 g of a 20.1 wt % solution) using the 50-micrometer average diameter polymeric resin milling media (3,000 g) over 20 h. Following milling, the dispersion/media milling mixture is diluted with a solution of Kordek MLX (25.0 g) in water (2,475 g) to a final pigment concentration of about 10% and theoretical dispersion batch size 5,000 g. The dispersion is separated from the milling media and it is subsequently filtered through a 0.3-micrometer effective pore diameter depth filter. Roughly 4 kg of dispersion is recovered, approximately 80% yield. The volume-weighted $50^{th}$ percentile particle size distribution diameter is about 60 nm, and the $95^{th}$ percentile particle size distribution diameter is about 105 nm.

Preparation of Continuous Ink Jet Ink Samples

Black pigment ink jet ink compositions Inks A-E were prepared from the pigment dispersions K-1 and K-2 by combining the ingredients at the relative proportions reported in Table I. In a representative procedure, 500 g of ink is prepared by combining the ingredients with good mixing proportioned according to Table I in a 1-liter polyethylene beaker containing a magnetic stirrer bar, in the following functional component order: water, acid, base, humectant, biocide, corrosion inhibitor, colorant, pigment dispersion, surfactant, and antifoamant. The ink composition is mixed for about 2 min between ingredient additions, and then it is stirred for 1 hour after the addition of the antifoamant.

The ink composition is filtered under 76 Torr of vacuum through a 47 mm Pall Corp. Versapor®-1200 membrane and then stored in a sealed bottle.

Example 1

Test Stand Stability

The ink reservoir of a continuous ink jet laboratory test stand jetting fixture was charged with Ink A (ca. 10 L). The fixture consisted of the following elements: a fluid system capable of pressuring the ink, delivering it to a drop generating printhead, returning it under vacuum to the ink reservoir, detecting the ink concentration by resistivity measurement and replenishing the ink with a replenisher fluid or adding more ink to the reservoir if depleted but at the correct ink concentration; and a developmental continuous inkjet Stream Printhead by Kodak operating a jetting module with a MEMS silicon-based drop generator to form drops of ink suitable for printing to produce an image on paper or for catching by air deflection and return to the ink reservoir when the printer is not printing an image file or when it is not printing a given pixel even if it is printing an image file. The test stand was operated for a three-day period, and ink was recirculated at less than ca. 70 psi pressure and ink drops were generated under printing or catching conditions for much of the working day. When not generating ink drops, the test stand recirculated ink in cross-flush mode or the test stand was shut down overnight. The ink reservoir was replenished with a solution of 0.10 wt % Proxel™ GXL and 0.001 wt % acetic acid when the recirculation unit determined that the reservoir should be refilled with solvent in order to maintain the correct ink colorant concentration; the pH of the replenisher solution was 8.8, and its conductivity was 0.13 mS/cm. Samples of ink were collected daily for laboratory measurement of colorant absorbance by UV/visible light spectrophotometry, disclosing the

TABLE I

Continuous Inkjet Ink Compositions

| Functional Component | Ingredient | Ink A (c) (Wt %) | Ink B (c) (Wt %) | Ink C (e) (Wt %) | Ink D (e) (Wt %) | Ink E (c) (Wt %) |
|---|---|---|---|---|---|---|
| Vehicle | Water | 49 | 48 | 31 | 39 | 54 |
| Pigment Dispersion | K-1 | 47 | 46 | | | |
| | K-2 | | | 53 | 53 | 40 |
| Colorant | Sensient Direct Black 19 Solution SF [Sensient Colors, Inc.] | | | 8.5 | | |
| Humectant | Glycerine | 3.0 | 2.9 | 6.0 | 6.0 | 6.0 |
| Biocide | PROXEL ® GXL [Arch Chemicals, Inc.] | 0.1 | 0.1 | 0.1 | 0.1 | 0.1 |
| Corrosion Inhibitor | COBRATEC TT-50S [PMC Specialties Group, Inc.] | 0.1 | 0.1 | 0.1 | 0.1 | 0.1 |
| Surfactant | SURFYNOL ® 440 [Air Products and Chemicals, Inc.] | 0.06 | 0.06 | 0.06 | 0.06 | 0.06 |
| Antifoamant | SURFYNOL ® DF-110L [Air Products and Chemicals, Inc.] | 0.15 | 0.15 | 0.08 | 0.08 | 0.08 |
| Acid | Acetic acid | | 0.57 | 0.25 | 0.39 | |
| | Molinity | | 0.095 | 0.042 | 0.065 | |
| Base | N,N-Dimethylethanolamine | | 0.84 | | | |
| | Molinity | | 0.094 | | | |
| | N-Methyldiethanolamine | | | | 0.80 | 1.44 |
| | Molinity | | | | 0.067 | 0.121 | degree of ink concentration control, and measurement of pH and conductivity by calibrated benchtop metering instruments, measured at ambient conditions and compensated to 25° C. Representative ion probes are the Mettler Toledo InLab® 413 pH electrode, No. 52000106, and the Coming Laboratory Conductivity Electrode, No. 476501, available in the Nova Analytics Pinnacle Series. The ink resistivity ρ reported in ohm-cm was calculated from the measured ink conductivity κ reported in mS/cm by the following formula:

ρ=1000/κ

In a similar fashion, the ink reservoir of the laboratory test stand jetting fixture was charged with Ink B (ca. 10 L) after thorough purging, and the Ink B recirculation stability was monitored over another three-day period. The stability performance for the two inks in recirculation is reported in Table II on a day-by-day basis, and the overall performance is assessed by calculating an average and a standard deviation. The spectrophotometric absorbance of the inks is related to colorant concentration in Table II, and it was found to be maintained accurately, on average. The concentration standard deviation for Ink A was significantly higher than that for Ink B, indicating poorer maintenance of the original ink concentration. The starting resistivity of Ink A was 982 ohm-cm, but the Ink B initial resistivity was 156 ohm-cm. The pH stability of Ink A and Ink B was similar, but both showed some drift, which was undesirable.

TABLE II

Test Stand Stability Evaluation

| | | Ink A (c) | | | | Ink B (c) | | |
|---|---|---|---|---|---|---|---|---|
| Entry | A | Conc. (%) | ρ (ohm-cm) | pH | A | Conc. (%) | ρ (ohm-cm) | pH |
| 1. Fresh | 0.72 | 100 | 982 | 8.56 | 0.70 | 100 | 156 | 8.01 |
| 2. Day 1 | 0.65 | 90 | 915 | 8.52 | 0.70 | 99 | 168 | 7.99 |
| 3. Day 2 | 0.73 | 102 | 834 | 8.49 | 0.71 | 100 | 156 | 8.09 |
| 4. Day 3 | 0.71 | 99 | 843 | 8.46 | 0.72 | 102 | 150 | 8.07 |
| 5. Average | 0.71 | 98 | 894 | 8.51 | 0.71 | 100 | 158 | 8.04 |
| 6. Standard Deviation | 0.036 | 5.1 | 69.2 | 0.04 | 0.01 | 1.3 | 7.6 | 0.05 |

Example 2

Air Sparged Ink Replenishment Stability

The effect of air ingestion into continuous ink jet ink on ink pH and resistivity stability was investigated by bubbling air or nitrogen gas through an ink sample and replenishing it with solvent replenisher solution when a float sensor determined that the fluid level had decreased below a threshold value. Ink E was charged into a 1-L ink reservoir and a submerged tube delivered air at a volumetric flow rate of ca. 4 standard cubic feet per hour. The ink was replenished with a solution of 0.10 wt % Proxel GXL and 0.001 wt % acetic acid when the float sensor determined that the reservoir should be refilled. The replenisher solution showed conductivity at 0.132 mS/cm and pH at 8.75. Samples of ink were taken every 24 hours for four days. Fresh ink was added to the reservoir after daily sampling to compensate for the ink that was removed, in order to maintain the reservoir volume. After completion of the four-day period, the apparatus was drained of Ink E and cleaned. Ink C was added to the reservoir and the experiment was repeated. The change of ink properties over time are reported in Table III.

TABLE III

Evaluation of Air-Sparged Inks Maintained with Float Replenishment

| | | Ink E (c) | | | Ink C (e) | | |
|---|---|---|---|---|---|---|---|
| Entry | | Conc. (%) | ρ (ohm-cm) | pH | Conc. (%) | ρ (ohm-cm) | pH |
| 1. Fresh | | 98.5 | 1,181 | 8.66 | 96.8 | 209.2 | 8.51 |
| 2. Day 1 | | 93.3 | 1,236 | 8.78 | 106.0 | 193.5 | 8.52 |
| 3. Day 2 | | 90.4 | 1,252 | 8.76 | 104.4 | 197.6 | 8.52 |
| 4. Day 3 | | 87.9 | 1,242 | 8.76 | 103.6 | 199.2 | 8.55 |
| 5. Day 4 | | 84.6 | 1,259 | 8.72 | 102.7 | 198.8 | 8.55 |
| 6. Average | | 90.9 | 1,234 | 8.74 | 102.7 | 199.7 | 8.53 |
| 7. Standard Deviation | | 5.3 | 31.1 | 0.05 | 3.5 | 5.8 | 0.02 |

The model replenishment of comparative control ink E was not as well regulated as that of example ink C. The colorant concentration of ink E dropped over time, and its correlation with the measured resistivity became poor over the course of the experiment. The pH of ink E was raised by the addition of the slightly alkaline replenisher solution over time, despite the likely formation of carbonic acid from carbon dioxide introduced into the ink due to the sparging with air. One standard deviation of the pH value was 0.05 pH units. Ink C replenishment was well regulated, and its colorant concentration remained stable; the correlation of the measured resistivity with colorant concentration was better that of ink E. The pH of ink E increased only slightly due to the addition of the slightly alkaline replenisher solution over the three-day experiment, and one standard deviation of the monitored pH was only 0.02 units.

Example 3

Conductive Ink pH Stability

Table IV describes the chemical properties of inks A-E resulting from the compositions related in Table I. Inks A and E are comparative control continuous ink jet pigment inks comprised of representative functional ingredients (colorant, biocide, corrosion inhibitor, humectant, surfactant, and antifoamant). The composition derived from these basic functional ingredients yields an acceptable pH level of 8.6, but it produces a resistivity value of about 1,000 ohm-cm. Comparative ink control ink B was prepared similarly to ink A, except that it contained 0.57 wt % of acetic acid and 0.84 wt % of base N,N-dimethylethanolamine. The ink B acid had a $pK_a$ (negative logarithm of the acid dissociation constant) of 4.5, and the conjugate acid of its base had a $pK_a$ of about 8.9, for a difference of about 4.4 log units in acidity. These mass fractions of acid and base are expressed as the concentration measure molinity in Tables I and IV, which is the moles of acid or base solute per kg of solution or mixture (ink, in this context). Expressed in the manner of molinity, the amounts of acid and base combined in ink B are equal in chemical equivalents, and the molar ratio of base to acid is 1.0. Ink B exhibits a much lower resistivity value of a 156 ohm-cm than ink A due the increased ionic conductivity afforded by the organic salt formed in situ from the acid-base reaction.

Inks C and D were prepared similarly to ink B. There was an immaterial change in the selection of the pigment dispersion (the same one used in ink E), and there were inconsequential adjustments to the humectant and antifoamant levels. The alkanolamine used in inks C and D was a slightly weaker base, N-methyldiethanolamine, with a lower conjugate acid $pK_a$ estimated to be about 8.7. The levels of acid-base salt formed in inks C and D were formulated to produce a resistivity about 250 ohm-cm. The molar ratio of base to acid was not unity as in ink B, but ranged between 1.6 and 1.9, and the ink pH was about 8.6 Samples (0.50 g) of inks A-E were diluted in 50 mL of water and were titrated with 0.1033-N aqueous hydrochloric acid using a Metrohm Titrino 716 automated titration apparatus, and the ink pH was monitored using a potassium chloride glass pH electrode. The quantity of titratable base in milliequivalents per gram of ink was determined from the titration curve endpoint that was identified by the Titrino 716 instrument for each ink sample, and it is reported in Table IV. In addition, the pH responses of the diluted ink sample to fixed aliquots of acid titrant (0.03 or 0.06 mL) are contained in Table IV. The titratable base of the high resistivity inks A and E was similar (about 0.04 mequiv/g) to that of the reduced resistivity ink B having a molar ratio of added base to acid of about one. The reduced resistivity example inks, C and D, showed more than twice titratable base than the comparative controls, however. The pH robustness of inks C and D to an aliquot of acid titrant was found to be greatly improved over inks A, B, and E.

Example 4

Web Press Imprinter Print Station Ink Stability

A commercial roll paper web press transport capable of greater than 1,000 fpm with a web reverser to enable duplex printing was supplied with 18-inch width roll papers for extended test printing. Paper rolls alternated between 24 lb basis weight text bond paper International Paper Dataspeed Laser MOCR and 60 lb basis weight C2S freesheet coated NewPage Sterling® Ultra gloss. The transport was outfitted with a tower to support two stations of four Kodak Stream Printheads each (eight total), allowing the imprinter to print the 18-inch roll paper full-width duplex (i.e., on both sides). The Printheads were supported on the tower over the web by a rail carriage system affording access to the printhead unit for maintenance and servicing. The carriage was supported by a precision web mount to ensure proper widthwise registration of the printheads and the desired printing drop trajectory to the paper. The printing subsystem units consisted of the eight Stream Printhead printhead interface controller box units each driving a monochrome 600 npi, 4.16-inch swath continuous ink jet printhead jetting module that was capable of 100 kHz print drop firing frequency; a flexible 40-ft "umbilical" tube containing electrical wiring and a variety of fluid lines for supplying and returning ink and other fluids to and from each printhead jetting modules; four dual channel fluid systems each capable of supporting two individual printheads that provided an ink reservoir, a replenisher fluid reservoir, a flushing fluid reservoir, fluid pumping subsystems, a vacuum return subsystem, and various electronic controllers; and a KODAK VERSAMARK CS410 System Controller to supply electronic control signals to all of the printheads, such

TABLE IV

Continuous Ink Jet Ink pH Stability

| Functional Component | Ingredient | | Ink A (c) | Ink B (c) | Ink C (e) | Ink D (e) | Ink E (c) |
|---|---|---|---|---|---|---|---|
| Acid | Acetic acid | | | | | | |
| | Wt % | | | 0.57 | 0.25 | 0.39 | |
| | $pK_a$ | 4.5 | | | | | |
| | Molinity | | | 0.095 | 0.042 | 0.065 | |
| Base | N,N-Dimethyl-ethanolamine | | | | | | |
| | Wt % | | | 0.84 | | | |
| | pKa (as acid) | 8.9 | | | | | |
| | Molinity | | | 0.094 | | | |
| | N-Methyl-diethanolamine | | | | | | |
| | Wt % | | | | 0.80 | 1.44 | |
| | $pK_a$ (as acid) | 8.7 | | | | | |
| | Molinity | | | | 0.067 | 0.121 | |
| Alkanol-amine Salt Formed | Molinity | | 0 | 0.09 | 0.04 | 0.07 | 0 |
| Base/Acid Molar Ratio | | | — | 1.0 | 1.6 | 1.9 | — |
| pH | | | 8.6 | 8.0 | 8.6 | 8.6 | 8.6 |
| Conductivity, κ (mS/cm) | | | 1.0 | 6.4 | 4.0 | 4.0 | 0.8 |
| Resistivity, ρ (ohm-cm) | | | 982 | 156 | 251 | 252 | 1,180 |
| Titratable Base (mequiv/g) | | | 0.04 | 0.03 | 0.09 | 0.09 | 0.04 |
| pH Change 0.03 mL/g | | | 0.15 | 0.11 | 0.04 | 0.04 | 0.12 |
| pH Change 0.06 mL/g | | | 0.32 | 0.24 | 0.08 | 0.08 | 0.29 | as the operational sequences (start-up, shutdown, cross flush, service clean, print, and other operating modes) and the instantaneous print data instructions (raster image processing) to apply ink to the paper to form characters and/or images. An extended production trial experiment was established. The fluid system ink supply reservoirs were sourced to a 55 gallon drum of ink C to refill the main ink supply reservoir as needed; the replenisher supply reservoir was sourced to a 20-L cubitainer of water containing 0.10 wt % of Rohm and Haas KORDEK™ MLX Biocide. The fluid systems' ink replenishment operation was based on the maintenance ink C resistivity using a set point value of about 250 ohm-cm. If a float switch in the ink reservoir determined that the fluid level in the reservoir under partial vacuum had dropped to the point that automated fluid addition was required, the controller operated supply valves admitting either replenisher or ink when the resistivity was below the target value, or at or above the target value, respectively.

Table V records the ink C reservoir condition for 26 days of operation using a single sample of ink C. Typically, the imprinter printing system operated for about two shifts per working day. In an example of typical operation, the printheads were put in print-ready jetting mode and non-printing "catch drops" were deflected into the ink gutter and the ink was returned under vacuum to the ink reservoir for reuse, in order to test jetting module lifetime. The web press was operated for periods at 45 fpm, and full-width duplex prints were made of diagnostic test targets, tone scales, barcodes, continuous tone images, representative customer images, etc. Occasionally the press was accelerated to 1,000 fpm for printing trials. As indicated in Table V, the ink reservoir was sampled as frequently as working schedules allowed to characterize the stability of the ink, up to daily measurements. As related earlier, ink spectrophotometry was carried out to determine the colorant concentration from the measured absorbance, and ink resistivity and pH were measured using normal analytical laboratory methods. At the conclusion of the 26 day test period, a new 55 gallon drum of a difference ink sample replaced the instant test sample of ink C. The simple statistics for the ink properties are summarized in Table V, and it is observed that the concentration of ink C was maintained with a slight bias at about 103% concentration and with high precision, since one standard deviation of the ink concentration was only 1.3%. The ink resistivity was likewise maintained precisely, with one sample standard deviation of 2.2 ohm-cm, or about 1%. The ink pH was also very stable, and it was maintained at about 8.73 with one standard deviation of 0.02 units.

TABLE V

Press-Mounted Imprinter Stability Evaluation

Ink E (e)

| Entry | | A | Conc. (%) | ρ (ohm-cm) | pH |
|---|---|---|---|---|---|
| 1. | Fresh | | | | |
| 2. | Day 1 | 1.86 | 103 | 249 | 8.74 |
| 3. | Day 5 | 1.89 | 105 | 249 | 8.73 |
| 4. | Day 7 | 1.87 | 104 | 249 | 8.77 |
| 5. | Day 8 | 1.80 | 100 | 256 | 8.74 |
| 6. | Day 11 | 1.84 | 102 | 253 | 8.71 |
| 7. | Day 12 | 1.84 | 102 | 251 | 8.69 |
| 8. | Day 13 | 1.86 | 103 | 250 | 8.70 |
| 9. | Day 14 | 1.83 | 102 | 248 | 8.69 |
| 10. | Day 15 | 1.87 | 104 | 248 | 8.73 |
| 11. | Day 18 | 1.86 | 103 | 249 | 8.75 |
| 12. | Day 19 | 1.87 | 104 | 249 | 8.73 |
| 13. | Day 20 | 1.88 | 104 | 249 | 8.72 |
| 14. | Day 21 | 1.87 | 104 | 249 | 8.72 |
| 15. | Day 22 | 1.89 | 104 | 248 | 8.72 |
| 16. | Day 26 | 1.85 | 103 | 252 | 8.73 |
| 17. | Average | 1.86 | 103.2 | 249.9 | 8.73 |
| 18. | Standard Deviation | 0.024 | 1.3 | 2.2 | 0.02 |

The invention has been described in detail with particular reference to certain preferred embodiments thereof, but it will be understood that variations and modifications can be effected within the spirit and scope of the invention.

What is claimed is:

1. A method of continuous ink jet printing comprising:
   A) supplying a main fluid supply of a continuous inkjet printer with an aqueous fluid composition comprising:
      an acidic salt of an organic amine; and
      additional free organic amine;
      wherein the acidic salt of the organic amine and the additional free organic amine are present at concentrations and in relative proportion to provide a buffered pH greater than about 8 and a resistivity less than about 500 ohm-cm at 25° C., the ratio of equivalents of organic amine to equivalents of acid used to form the acidic salt of the organic amine being greater than 1.1:1.0;
   B) ejecting a continuous stream of droplets of the fluid composition from a drop generator mechanism; and
   C) in response to electrical signals received from a control mechanism, selecting between printing fluid drops for marking a substrate and nonprinting fluid drops that are collected, returned to the main fluid supply, and replenished as a function of the resistivity of the fluid composition in the main fluid supply.

2. The method of claim 1 wherein the aqueous fluid composition is an ink jet ink composition further comprising dispersed pigment particles.

3. The method of claim 1 wherein the aqueous fluid composition further comprises an organic solution polymer suitable to provide a protective overcoat over colored ink printed or unprinted portions of the substrate.

4. The method of claim 2 wherein the acidic salt of the organic amine has a pKa of at least about 7.5.

5. The method of claim 2 wherein the acidic salt of the organic amine has a pKa of about 8.5 to 9.0.

6. The method of claim 2 wherein the buffered pH is between about 8 and 10.

7. The method of claim 2 wherein the buffered pH is between about 8.5 and 9.0.

8. The method of claim 2 wherein the acidic salt of organic amine and the organic amine comprise one or more alkanolamines.

9. The method of claim 2 wherein the acid used to form the acidic salt of organic amine has a pKa of less than about 6.5, and the pKa of the acid is at least 2 units lower than that of the formed acidic salt of the organic amine.

10. The method of claim 2 wherein the acid used to form the organic amine salt comprises a carboxylic acid group.

11. The method of claim 2 wherein the pigment comprises carbon black.

12. The method of claim 2 wherein the pigment comprises a cyan, a magenta, or a yellow colored pigment.

13. The method of claim 2 wherein the pigment is dispersed with a polymeric dispersant.

14. The method of claim 2 wherein the ratio of equivalents of organic amine to equivalents of acid used to form the acidic salt of the organic amine is from 1.3:1.0 to 3.0:1.0.

15. The method of claim 2 further comprising a water soluble anionic dye.

16. The method of claim 2 wherein the resistivity is less than about 300 ohm-cm.

17. The method of claim 2 wherein the resistivity is between about 200 and 300 ohm-cm.

18. The method of claim 2 wherein the acidic salt of organic amine and the organic amine comprise one or more tertiary alkanolamines.

19. The method of claim 2 wherein the ink jet ink composition is replenished by:
- sensing the resistivity of ink in or obtained from a main ink supply of the continuous inkjet printer; and
- replenishing the ink in the main ink supply of the inkjet printer with ink from a supplemental ink supply and carrier fluid from a replenishment carrier fluid supply as a function of the sensed resistivity of the ink.

* * * * *